(12) United States Patent
DiFoggio

(10) Patent No.: US 7,703,328 B2
(45) Date of Patent: Apr. 27, 2010

(54) PRESSURE SENSOR UTILIZING A LOW THERMAL EXPANSION MATERIAL

(75) Inventor: Rocco DiFoggio, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 359 days.

(21) Appl. No.: 11/436,737

(22) Filed: May 18, 2006

(65) Prior Publication Data

US 2007/0277974 A1    Dec. 6, 2007

(51) Int. Cl.
*G01L 11/00* (2006.01)
(52) U.S. Cl. .......................... 73/702; 73/703
(58) Field of Classification Search .................. 73/703, 73/702
See application file for complete search history.

(56) References Cited

U.S. PATENT DOCUMENTS

| | | | | |
|---|---|---|---|---|
| 4,565,096 A | * | 1/1986 | Knecht | 73/718 |
| 5,367,911 A | * | 11/1994 | Jewell et al. | 73/861.08 |
| 2001/0045130 A1 | * | 11/2001 | Wooh | 73/600 |
| 2004/0093948 A1 | | 5/2004 | Kelner et al. | |
| 2005/0028579 A1 | | 2/2005 | Owen | |
| 2005/0193826 A1 | | 9/2005 | Oda et al. | |
| 2005/0252299 A1 | | 11/2005 | Oda | |
| 2006/0053894 A1 | | 3/2006 | Kunda et al. | |
| 2006/0179954 A1 | | 8/2006 | Suzuki et al. | |
| 2007/0022803 A1 | * | 2/2007 | DiFoggio et al. | 73/64.53 |
| 2007/0129901 A1 | * | 6/2007 | DiFoggio et al. | 702/54 |
| 2007/0234780 A1 | * | 10/2007 | Gysling et al. | 73/19.03 |

OTHER PUBLICATIONS http://physics.nad.ru/Physics/English/ifp_txt.htm; Fiber Optic Interferometer Fabry-Perot.
http://en.wikipedia.org/wiki/Fabry-Perot_interferometer, Fabry-Perot interferometer, From Wikipedla, the free encyclopedia.
http://www.nasatech.com/Briefs/Jan99/LEW16610.html; Fabry-Perot Fiber-Optic Temperature Sensor; Lewis Research Center, Cleveland, Ohio.
A. Wang, H. Xiao, J. Wang, Z. Wang, W. Zhao, R.G. May; Self-calibrated Interferometrlc-intensity-based optical fiber sensors; Journal of Lightwave Technology, vol. 19, Issue 10, Oct. 2001, pp. 1495-1501 Abstract.
Bing Qi, Gary Pickrell, Po Zhang, Yuhong Duan, Wei Peng, Juncheng Xu, Zbenyu Huang, Russell G. May and Anbo Wang; Fiber Optic Pressure and Temperature Sensors for Oil Down Hole Application, Photonics Lab., The Bradley Dept. of Electrical & Computer Engr., pagages 182-191.
http://astro.berkeley.edu/~jrg/MATERIALS/node8.html; ULE fused silica, pp. 1-3.
John W. Berthold III and Richard L. Lopushansky; Intrinsically-Safe Fiber Optic Sensors Reduce Cost and Improve Process Control; Copyright 2003 by ISA, Presented by ISA EXPO, 2003.

(Continued)

Primary Examiner—Andre J Allen
(74) Attorney, Agent, or Firm—Bracewell & Giuliani LLP

(57) ABSTRACT

A pressure sensor for use in measuring the pressure within fluids. The sensor comprises a medium whose material has a low coefficient of thermal expansion. The pressure can be measured by observing how signals pass through the medium at some unknown pressure and then comparing the observations to how the signals pass through the medium at a known pressure. The signals can be acoustic waves or light waves.

38 Claims, 4 Drawing Sheets

OTHER PUBLICATIONS

Markus Schmidt, Bernd Werther, Norbert Furstenau, Michael Matthias, Tobias Metz; Fiber-Optic Extrinsic Fabry-Perot Interferometer Strain Sensor with <50 pm displacement resolution using three-wavelength digital phase demodulation, Optics Express, vol. 8, No. 8, Apr. 9, 2001, pp. 475-480.

A Ezbiri and R. P. Tatam; Rapid Communication Interrogation of low finesse optical fibre Fabry-Perot interferometers using a four wavelength technique; Meas. Sci. Technol. 7 (1996), pp. 117-120.

Richard Fox, Kristan Corwin, Leo Hollberg; Stable Optical Cavities for Wavelength References; NIST Technical Note 1533, May 2004, pp. 1-24.

Charles T. Rivenburgh, Fiber Optic Pressure Sensor.

http://www.ajp.org/tip/INPHFA/vol-9/iss-3/p24.html; Fiber Bragg Grating How it works.

Breck Hitz; Fiber Laser Interrogates Fiber Bragg Grating Sensors, http://www.photonics.com//content/spectra/2003/December/research/77476.aspx.

Tsutomu Yamate, Rogerio T. Ramos, Robert J. Schroeder, Eric Udd; Thermally Insensitive Pressure Measurements up to 300 degree C Using Fiber Bragg Grating Written onto Side Hole Single Mode Fiber, Abstract.

Ken Hrdina; Production and Properties of ULE Glass with Regards to EUV Masks; presented at The International Workshop on Extreme Ultraviolet Lithography, Monterey Marriott Hotal, Oct. 10-13, 1999.

Mary J. Edwards, Emily H. Bullock, Deborah E. Morton; Improved precision of absolute thermal expansion measurements for ULE glass; SPIE vol. 2857, pp. 58-63.

Ichiro Ohno, Makoto Abe, Masaki Kimura, Yoichi Hanayama, Hitoshi Oda, Isao Suzuki; Eleasticity measurement of silica glass under gas pressure, American Mineralogist, vol. 85, pp. 288-291, 2000.

Henry E. Hagy; High Precision Photoelastic and Ultrasonic Techniques for Determining Absolute and Differential Thermal Expansion of Titania-Silica Glasses; Applied Optics, vol. 12, No. 7, Jul. 1973.

H. E. Hagy and W. D. Shirkey; Determining absolute thermal expansion of titania-silica glasses: a refined ultrasonic method; Applied Optics, vol. 14, No. 9, Sep. 1975, pp. 2099-2103.

http://www.mellesgriot.com/products/optics/mp_3_6.htm; Zerodur.

S.F. Jacobs, S.C. Johnston, J.M. Sasian, M. Watson, J.D. Targove, D. Bass; Surface figure changes due to thermal cycling hysteresis; Applied Optics, vol. 26, No. 20, Oct. 15, 1987.

Errol P. Eernisse: Quartz Resonators vs Their Environments: Time Base or Sensor?; Jpn. J. Appl. Phys. vol. 40 (2001) pp. 3470-3483, Part 1 No. 5B, May 2001.

Chandra M. Sehgal; Non-linear ultrasonics to determine molecular properties of pure liquids; Ultrasonics 1995 vol. 33 No. 2, pp. 155-161.

M. S. King; Wave Velocities in Rocks as a Function of Changes in Overburden Pressure and Pore Fluid Saturants; Geophysics, vol. XXXI, No. 1 (Feb. 1966), pp. 50-73.

M.R.J. Wyllie, A.R. Gregory, G.H.F. Gardner; An Experiemental Investigation of FActors Affecting Elastic Wave Velocities in Porous Media; Geophysics, vol. XXIII, No. 3 (July), pp. 459-493.

Linear Coefficient of Thermal Expansion (CTE); Quality Grade Selection Chart, Corning Incorporated, Canton, New York 13617.

http://www.lunainnovations.com/products/downloads/System_Fiberscan.pdf.

Trevor Rice, Luna Innovations Fiber Optic Pressure Sensor, Luna Innovations, Blacksburg, VA 24060.

* cited by examiner

PRESSURE SENSOR UTILIZING A LOW THERMAL EXPANSION MATERIAL

BACKGROUND OF THE INVENTION

1. Field of the Invention

The disclosure relates generally to the field of sensors. More specifically, the present disclosure relates to a pressure sensor. Yet more specifically, the present disclosure concerns a pressure sensor within a wellbore and a method of using the pressure sensor.

2. Description of Related Art

Pressure gauges or sensors typically measure fluid pressure by communicating with the fluid whose pressure is being measured and transferring the pressure of the fluid being measured to a medium associated with the gauge. The medium generally reacts to the applied pressure, wherein a subsequent gauging of how the medium reacts can be correlated to provide a value for the measured pressure. An example of one such medium includes a fluid column, where the fluid density is known so that any corresponding change in elevation of the fluid column can easily be converted to a pressure reading. Other mediums include Bourdon tubes, springs, diaphragms, piezoelectric devices, piezorestrictive devices, and capacitive manometers.

Currently, some pressure sensors used in subterranean wellbores include a quartz resonator whose resonant frequency changes with pressure. However, a quartz resonator's resonant frequency also changes with temperature. Cutting the quartz crystal along different crystal axis can minimize its temperature sensitivity and maximize its pressure sensitivity. However, temperature compensation is still necessary and is generally accomplished using a second quartz resonator that is in thermal contact with the pressure-sensing resonator but which is not exposed to the high pressure of the downhole fluid. Sometimes a third, reference resonator is also used as a time base. For pressure sensing, the orientations include AT- or BT-cut. For temperature sensing, the orientations include AC- or BC-cut. For a time-base or frequency reference (which is not exposed to pressure) the orientation is generally SC-cut. Other pressure sensors used in downhole applications involve exposing an optical medium to fluid pressure, passing a light signal through the medium, and monitoring the behavior of the light passing through the medium. Examples of such optical mediums include a Fiber Bragg grating and a Fabry-Perot interferometer.

These pressure-sensing devices are subject to high ambient temperatures as well as to sudden but small variations in ambient temperature during sudden pressure changes, which are inherently adiabatic. As the temperature of the pressure sensor changes, the corresponding pressure reading changes too and a correction is necessary. However, when trying to monitor a pressure pulse as a function of time, as is often done, a complete temperature correction may not be possible because the local change in temperature of the pressure sensor cannot be corrected using the temperature sensor's reading because there is insufficient time for the temperature sensor to have reached thermal equilibrium with the pressure sensor.

Fiber Bragg Gratings (FBG) can be used as optical sensors for pressure and temperature and are typically made by inscribing a repeated pattern of refractive index variations into an optical fiber. These FBG production means are generally well known in the art such as by using the interference pattern of two intense UV laser beams. Changes in strain, stress, or temperature experienced by the fiber affect the light reflected from the FBG. The changes in light reflection are then correlated to changes in ambient conditions experienced by the FBG.

One example of a Fabry-Perot interferometer 54 is shown in FIG. 1. These devices typically comprise an optical fiber 56 having one end secured within a housing 64. The housing 64 also retains a diaphragm 60 shown opposite from the terminal end of the optical fiber 56. The housing 64 is configured to have a cavity 58 therein, although the optical fiber 56 extends a distance into the cavity 58, a gap 66 still exists between the terminal end of the optical fiber 56 and the diaphragm 60. The inner surface 62 of the diaphragm 60 is proximate to the fiber 56 and the outer surface 61 is subjected to pressure ambient to the interferometer 54. Light rays (R1 and R2) are emitted to the terminal end of the fiber 56 wherein at least a portion of these rays reach the inner surface 62 of the diaphragm 60. When light is passed through the fiber 56, a portion of the light reflects (R2) at the tip back into the fiber 56, and a portion (R1) passes through the tip to the diaphragm and reflects from the diaphragm back into the fiber 56. As R1 and R2 propagate back through the fiber 56, the gap in reflection distance between R1 and R2 results in measurable light interference between the two signals. Changes in pressure on the outer surface 61 of the diaphragm 60 affects the gap length 66 that in turn alters the measured light interference. The amount of interference can be correlated into the pressure exerted onto the outer surface 61 based on the change in gap width due to pressure changes.

The responsiveness of these devices can be affected by temperature. While temperature compensation means can be implemented for use with these devices, there exists a need for a pressure sensor whose readings are not in error and do not overshoot during pressure pulses and which have high resolution, high sensitivity, high dynamic range, and which can be operated at high downhole pressures and temperatures.

BRIEF SUMMARY OF THE INVENTION

The present disclosure includes a method of measuring pressure with a pressure sensor, where the pressure sensor contains a medium comprised of a material having a low coefficient of thermal expansion. The method further includes disposing the sensor within a fluid and sending an acoustic or optical signal through the sensor medium. The acoustic signal's travel time through the sensor medium or the optical interference pattern is observed and from these the ambient pressure acting upon the sensor is determined.

This method further includes establishing a baseline signal travel time by disposing the sensor in a fluid of known pressure and observing signal travel time through the medium or observing the interference pattern. Optionally the sensor can be disposed within a wellbore and used in measuring fluid pressure therein. When disposed in a wellbore the sensor can be attached to a wireline tool. The medium for use with this method can have a coefficient of expansion of from less than 1000 parts per billion per degree Celsius and, optionally, it can be made of a titania-silica glass that is 7.5% titania and 92.5% silica. Such glass is sold by Corning under the name Ultra Low Expansion (ULE) 7972 glass. Its coefficient of thermal expansion is below 35 parts per billion per degree Celsius from 0 to 35° C. and below 80 parts per billion per degree Celsius from 0 to 200° C. Another glass that has a very low coefficient of expansion glass is sold by Schott under the name Zerodur. Its coefficient of thermal expansion is below 50 parts per billion per degree Celsius from 20° C. to 300° C.

The medium for use with the pressure sensor of the present method may comprise two substantially parallel outer surfaces. Alternatively, the method may also include coupling a transducer with one of the surfaces, where the transducer produces the acoustic signal. A second transducer may be added on the other surface, wherein the second transducer is capable of receiving the acoustic signal produced by the first transducer.

An optional method of determining fluid pressure in included herein, this method comprises disposing a medium within a fluid, passing a signal through the medium, measuring the behavior of the signal passing through the medium to obtain an ambient behavior, comparing the measured signal behavior with the baseline signal behavior within the medium at a known pressure, and calculating the fluid pressure based on the difference in signal behavior between the ambient and the baseline behaviors. Optionally, the signal may be an acoustic signal optionally produced by a transducer coupled to the medium. Also, when signal is in acoustic form, the signal behavior may comprise the sound speed through the medium. Optionally, the signal behavior may comprise the optical interference of an optical signal used in conjunction with the medium.

The present disclosure also includes a fluid pressure device comprising, a medium having a low thermal expansion, a signal generator coupled to the medium, and a signal detection device in communication with the medium. The signal generator may produce an acoustic signal and the sound speed within the medium may vary with changing pressure. The signal generator may comprise a transducer configured for generating and receiving an acoustic signal. The fluid pressure device may further comprise a second transducer coupled with the medium, where the second transducer may be configured to receive an acoustic signal. Optionally, the signal generator can produce a light signal and the signal detection device can detect the optical interference of the medium. The optical interference of the medium may vary with changing pressure.

DETAILED DESCRIPTION OF THE INVENTION

Figure 2A:
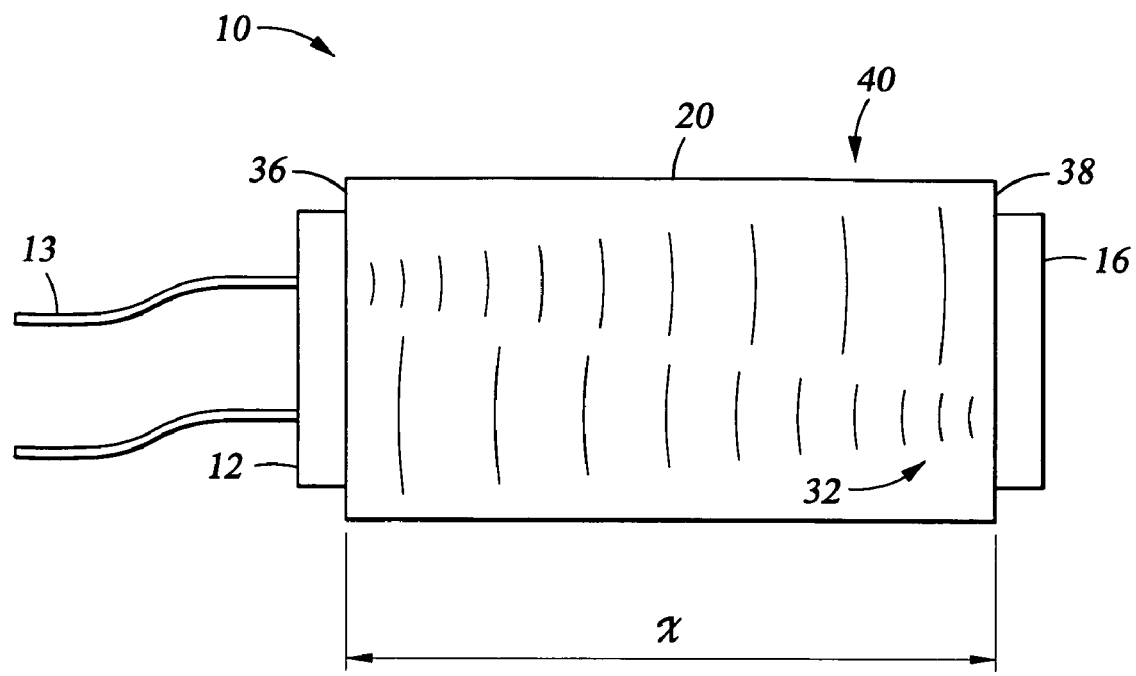
FIGS. 2a and 2b provide side views of embodiments of a pressure sensor.

The present disclosure includes a pressure sensor for measuring fluid pressure using a material responsive to pressure changes, also included herein is a method for using the pressure sensor. An embodiment of a pressure sensor is provided in FIG. 2a, in this embodiment the pressure sensor 10 comprises a medium 20 whose material has a low coefficient of thermal expansion that is below 1000 parts per billion per degree Celsius.

Referring now again to FIG. 2a, an acoustic transducer 12 can be coupled to a first surface 36 of the medium 20. Leads 13 can be connected to the transducer 12 for providing energy for activating the transducer 12. Additionally, the acoustic transducer 12 can be used as a signal detector for receiving and detecting acoustic waves propagating through the medium 20; in that embodiment the leads can transmit a signal correlating to the acoustic signal received by the receiver. The coupling should be such that when activated, the acoustic transducer 12 can impart an acoustic wave 32 into the medium 20. Optionally a signal detector for receiving and detecting the acoustic signal can be included with the sensor 10. One example of a signal detector includes an acoustic receiver 16 coupled with a surface of the medium disposed on the opposite side of the medium 20. Similarly, the coupling of the acoustic receiver 16 should be such that it is capable of receiving acoustic signals, like the acoustic wave 32 produced by the acoustic transducer 12. An example of a signal source for creating the acoustic wave, such as an acoustic transducer, is the Panametrics VideoScan transducer can be used in a pulse echo mode. However any other device capable of emitting a acoustic signal, including reflectable acoustic signals, within the medium could be used as a suitable signal source for use with the device disclosed herein.

As shown, the medium 20 has a rectangular form with the opposing surfaces (36, 38) that lie substantially parallel to one another. However it should be pointed out that the sensor 20 could also be configured wherein its opposing surfaces lie at generally oblique angles to one another. Moreover the medium 20 can have shapes other than the rectangular one of FIG. 2a. For example, as shown, the perimeter 40 connecting the outer edges of the first surface 36 and the second surface 38 is comprised of a series of surfaces jointed at substantially right angles to one another. This perimeter however could have any other suitable shape, such as a generally curvilinear shaped member instead.

Figure 2B:
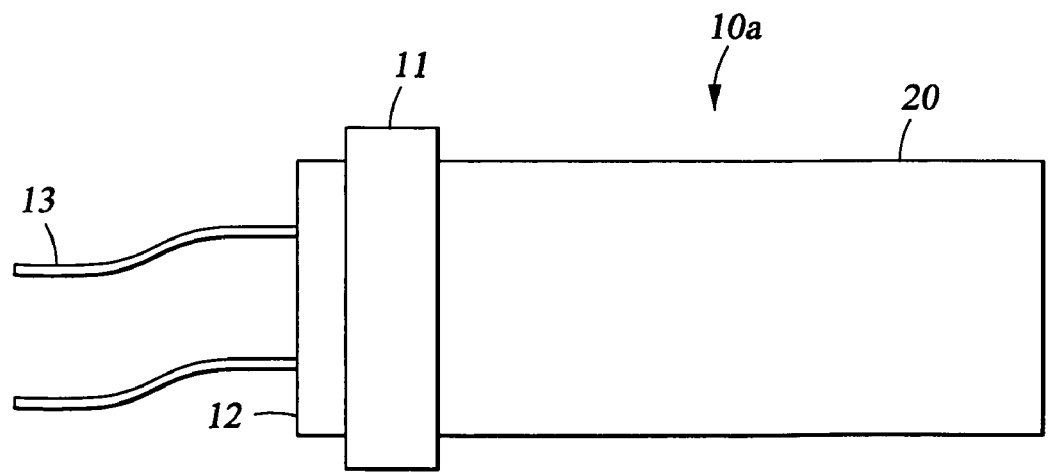

The embodiment of the pressure sensor 10a illustrated in FIG. 2b includes a pressure bulkhead 11 on which the medium 20 is attached. In this configuration an acoustic transducer 12a is secured to the bulkhead 11 on the side opposite the medium 20. The bulkhead 11 can be a part of a structure used in housing the pressure sensor 10a.

As discussed above, the medium 20 should be constructed of a material having a low coefficient of thermal expansion (CTE), that is a CTE of less than about 1000 ppb/° C., including equal to or less than about 500 ppb/° C., including equal to or less than about 250 ppb/° C., including equal to or less than about 100 ppb/° C., including equal to or less than about 50 ppb/° C., including equal to or less than about 30 ppb/° C., including equal to or less than about 25 ppb/° C., including equal to or less than about 20 ppb/° C., and including equal to or less than about 10 ppb/° C. Included within materials having a low coefficient of thermal expansion are materials having an ultra-low coefficient of thermal expansion (ULE). These ULE materials have been defined as having a coefficient of thermal expansion of 0+/−30 ppb/° C. over the temperature range of 5° C. to 35° C. The CTE of the medium 20 is not limited to the ranges specifically cited here, but can include any of the upper ranges coupled with any of the lower ranges of CTE.

Fused silica is one example of a material having a suitably low coefficient of thermal expansion for use with the device and method herein disclosed. Fused silica is a synthetic silicon dioxide ($SiO_2$) that can be made either with a flame or vapor phase hydrolysis of silicon halide. One example of a candidate for fused silica is the Corning® 7971 ultra low expansion glass which is fused silica doped with titanium. Corning® 7971 may be obtained from Corning Inc., Corning, N.Y. 14831. More specifically Corning® 7971 is a combination of 92.5% silicon dioxide and 7.5% titanium dioxide. To form this material, liquid $SiCl_4$ and $TiCl_4$ are mixed together and the combined vapors are delivered to a furnace where they are reacted chemically. This produces glass droplets that are subsequently deposited onto a spinning turntable. Parallel faces of a piece of this material can be ground and polished flat. For acoustic signals the flatness is not as critical as for the optical signal. In a highly reflective optic mode of practicing this invention, a metal vapor can be deposited on the flat surfaces to make a mirror coating. Other candidates for the material include products sold under the tradenames Corning® 7971 and Zerodur®.

One method of measuring fluid pressure of the present disclosure involves determining the sound speed of the medium 20 while the medium 20 is exposed to fluid pressure. This method comprises disposing the sensor 20 within a fluid and emitting an acoustic wave 32 through the medium 20. The acoustic wave 32 in turn propagates through the medium 20; the propagation travel time is used to determine the sound speed of the acoustic signal through the medium 20. Using the determined sound speed, the pressure of the fluid in which the sensor 20 is subjected to can then be determined.

Figure 1:
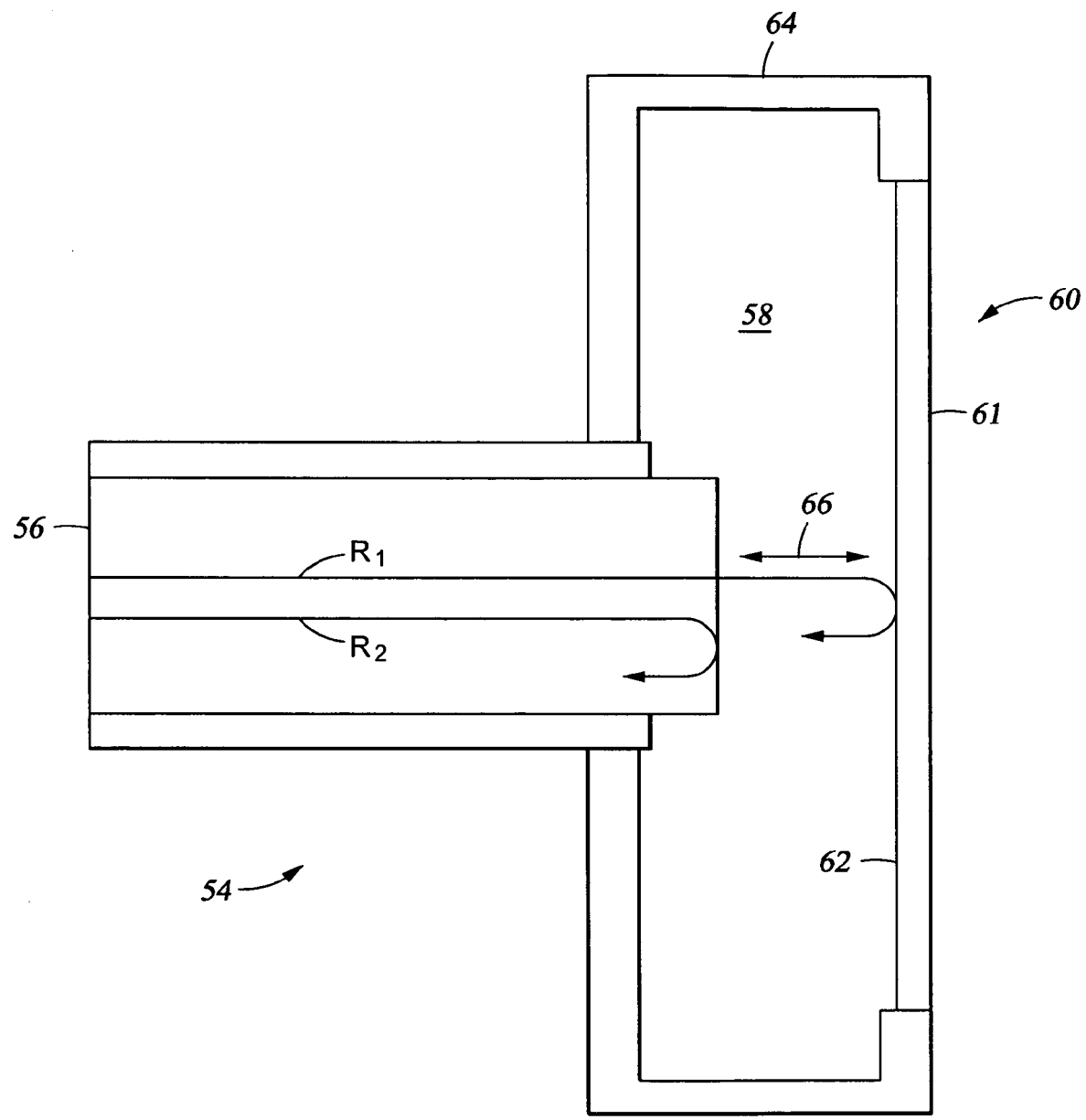
FIG. 1 is a cutaway view of a prior art device.

More specifically the sound speed of the acoustic signal traveling through the medium 20 can simply be determined by measuring the elapsed time it takes for the acoustic wave to travel a predetermined distance through the medium and then dividing the predetermined distance by the elapsed time. The sound speed can be determined using either the acoustic transducer 12 alone, or the acoustic transducer 12 in combination with the acoustic receiver 16. When using the acoustic transducer 12 by itself, the sound speed would then be determined by measuring the acoustic wave 32 signal travel time from the first surface 36 to the second surface 38 and then back from the second surface 38 to the first surface 36. This measured signal travel time through the medium 20 would then be divided into twice the value of the distance between these respective surfaces. The distance between the first and second surfaces (36, 38) is denoted in FIG. 1 as x. In the situations where the optional acoustic receiver 16 is coupled with the second surface 38, the sound speed would be determined by measuring the amount of time required for the acoustic wave 32 to travel from the first surface 36 to the second surface 38 (as measured by the acoustic receiver 16). Thus the sound speed can be determined by dividing the thickness value of the medium 20 (i.e. x) by the travel time from the first surface to the second surface (36, 38).

In order to obtain useful data from observed sound speeds, the pressure measuring device disclosed herein should first be calibrated by obtaining sound speed values at various known pressures. Calibrating a pressure measuring device having a sensor as disclosed herein involves (1) exposing the sensor to a particular known pressure, (2) observing the sound speed in the medium at the known pressure, and (3) repeating steps (1) and (2) over a range of pressures. The pressure range of step (3) can include pressure points taken at equal intervals, or can be focused on a specific range that may apply to a particular application. Similar steps can be taken to calibrate the optical response against known pressures.

It should be pointed out that in situations where the sensor 20 is subjected to a sufficient pressure, this added pressure can affect the travel time in two ways, this especially so when using the single acoustic transducer 12 since the acoustic wave 32 passes through the medium 20 twice. The pressure effects are first that the pressure can compress the medium 20 such that the distance between the two faces decreases thereby lowering the travel time. The second effect, and possibly more significant, is the increase in the stiffness of the material with pressure. Accordingly, a medium with a low thermal expansion can then be calibrated at different pressures before taking the particular pressure measurement of a fluid of unknown pressure.

If the coefficient of thermal expansion of the material comprising the medium is $\alpha$, then the fractional change ($\epsilon$) of the length (L) of the material for a temperature change (T) equals a T. The length, L+$\Delta$L, after thermal expansion equals:

$$L+\Delta L = L(1+\epsilon) = L(+\alpha T) \tag{1}$$

For very small $\epsilon$, we can approximate $(1+\epsilon)^n$ with $(1+n\epsilon)$, therefore the changed areas, volumes, and mass per unit volume, $\rho$, (the mass does not change) are approximately:

$$A+\Delta A = A(1+2\epsilon) = A(1+2\alpha T) \tag{2}$$

$$V+\Delta V = V(1+3\epsilon) = L(1+3\alpha T) \tag{3}$$

$$\rho+\Delta\rho = \rho(1-3\epsilon) = \rho(1-3\alpha T) \tag{4}$$

For an acoustic signal traveling between two parallel faces of a low expansion material that are separated by a distance L/2, the round trip travel time t equals L/c, where c is the speed of sound in the material. The new round trip travel time, (t+$\Delta$t)=(L+$\Delta$L)/(c+$\Delta$c), can be approximated as:

$$t+\Delta t = L(1+\alpha T)/(c+\Delta c) \tag{5}$$

For a solid material whose bulk modulus is B, whose shear modulus is G, and whose mass density is $\rho$, the speed of sound through a large cross section piece of this material is, $$c = \{[B+4G/3]/\rho\}^{1/2} \tag{6}$$

$$c+\Delta c = \{[(B+\Delta B)+4(G+\Delta G)/3]/(\rho+\Delta\rho)\}^{1/2} \tag{7}$$

The last factor of equation 7, $(\rho+\Delta\rho)^{1/2}$, can be approximated as $\rho^{1/2}(1+3\alpha T/2)$. By choosing a material whose $\alpha$ is extremely low, the effect of this $(1+3\alpha T/2)$ factor's deviation from unity is negligible compared to the pressure-induced deviations of the factors $(1+\Delta B/B)$ and $(1+\Delta G/G)$ from unity. Accordingly, when exposed to an increasing pressure, changes in the sound speed within a medium comprised of a material having a low coefficient of expansion are affected more by the effect of pressure stiffening than by a decrease in medium dimensions. Confirmation of this conclusion is found in published data on glass bead packs (Wyllie, Geophysics 23, 459-493, FIG. 10). If it is assumed that a medium comprised of ultra low expansion glass behaves similarly to glass bead packs, the pressure stiffening of this material (which is 93% silica) should experience an approximately 80% increase in sound speed when its ambient pressure is increased from 0 psi to 8000 psi.

The increase in sound speed with pressure provides a basis for determining pressure from sound speed. Furthermore, the accuracy of measuring sound speed has improved in recent years due at least in part because clock oscillators have become much more stable and both clocks and analog to digital converters have become faster and digital signal processing has also advanced. Sound speed can now measured within a few parts per million. For example, the miniSVS sound velocity sensor that is made by Valeport is reported to have an accuracy of 0.002 m/sec at 1500 m/sec, which corresponds to measuring sound speed to within 1.3 parts per million.

Bulk modulus (B) is defined as the ratio of the change in pressure acting on a volume to the fractional change of that volume. Bulk modulus can be expressed by the following relationship: $B=-\Delta P/(\Delta V/V)$. The negative sign indicates that the volume shrinks as the pressure increases. Using one example of an ultralow expansive material, Corning® 7972, its bulk modulus, B=4.95 million psi at atmospheric pressure. Therefore, the volume of this material should decrease by 0.1% when the pressure increases by 4.95 thousand psi from atmospheric pressure. B and G also have some dependence on temperature. However, published data on Corning® 7972 (Hagy, Applied Optics Vol. 14, No. 9, p. 2099-2013, Equation 9) show that the change in sound speed with temperature, due to temperature softening, is only −0.0117% per degree Celsius. For the acoustic mode of the present invention, the effect of temperature on sound speed can be negated using a table.

For a cube of length, L, and volume V, $V=L^3$, it is known that $(V+\Delta V)=(1+\epsilon)^3 L^3$ which, for small fractional changes in volume, can be approximated as $(1+3\epsilon)L^3$ so $\Delta V/V=3\epsilon$ when $\Delta L/L=\epsilon$. That is, for very small volume changes, the fractional change in volume is about approximately 3 times the fractional change in length. Therefore, a 0.1% decrease in volume corresponds to a 0.033% decrease in length at 4.95 thousand psi, which corresponds to 14,850 psi per percent change in length.

Extremely small changes in a Fabry Perot gap distance can be routinely measured. For example, Luna Innovations reports a 1 nm resolution in gap width changes using an 830 nm laser (http://www.lunainnovations.com/products/downloads/System_Fiberscan.pdf). A recent paper reported 50 pm resolution of a Fabry Perot gap (Markus Schmidt, et. al., Optics Express, April 2001, Vol 8, No. 8, p. 475-480). For a 1 mm thick plate of ULE glass used as a Fabry Perot gap, a 1 nm change in thickness corresponds to a pressure change of 1.485 psi and a 50 pm change in thickness corresponds to a pressure change of 0.074 psi. In general, the thicker the plate and the shorter the wavelength of light used the greater the sensitivity of the interference pattern to the pressure-induced compression of the plate. However, plate thickness should not exceed the coherence length of the light that is used.

Optionally a method of measuring fluid pressure may comprise passing a light wave through the medium at pressure, measuring the optical interference of the light wave, and then comparing the optical interference of the light wave through the medium at some calibrated pressure. When using light waves, as will be discussed in more detail below, the pressure sensor is more sensitive to size changes of the medium due to variations in pressure. The size changes in the medium affect the optical interference of light waves directed through the medium. One example of a signal source for generating these light waves and directing them through the medium can be a laser diode such as JDS Uniphase SDL 5800. However the signal source for the generation of light waves that pass through the medium can include any device capable of emitting a light wave, including a reflectable light wave, through the medium.

Figure 3:
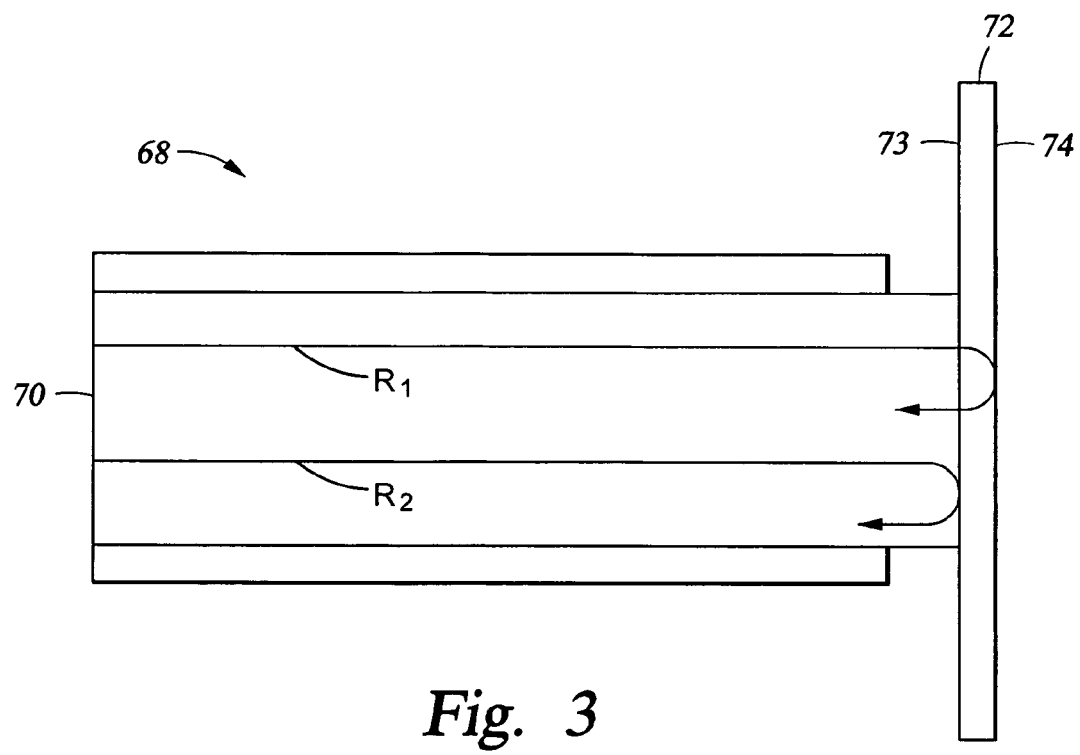
FIG. 3 is a cutaway view of an embodiment of a pressure sensor.

With regard to the optical mode of the device herein described, it may comprise a reflective surface formed of material having a low or ultralow coefficient of thermal expansion. Examples of pressure sensors embodying optical mode functions in accordance with this disclosure are provided in FIGS. 3 in 4. In the embodiment of FIG. 3, the pressure sensor 68 comprises a fiber optic member 70 combined with an optical plate 72. Here the forward tip of the fiber optic member 70 is in contact with a first surface 73 of the optical plate 72. Similar to the Fabry-Perot interferometer, a portion of the light passing through the fiber optic member 70 reflects from the interface of the fiber optic member 70 and the optical plate 72 back into the fiber optic member 70 (R2). Also, a portion of the light is transmitted through the interface, to the second surface 74 of the optical plate 72 and reflects back into the fiber optic member 70 (R1). In this embodiment, the second surface 74 of the optical plate 72 is subjected to the ambient environment, such that a change in ambient pressure can change the thickness of the plate 72. The plate thickness will decrease with an increase in pressure and can expand with a decrease in pressure. The changes in plate thickness affects the phasing of ray R1 reflecting from the second surface 74 that results in a corresponding change on the interference of the reflected rays (R1, R2) within the fiber optic member 70. In this embodiment, the optical plate 72 can be comprised of a material having a low coefficient of thermal expansion or an ultralow coefficient of thermal expansion.

Figure 4:
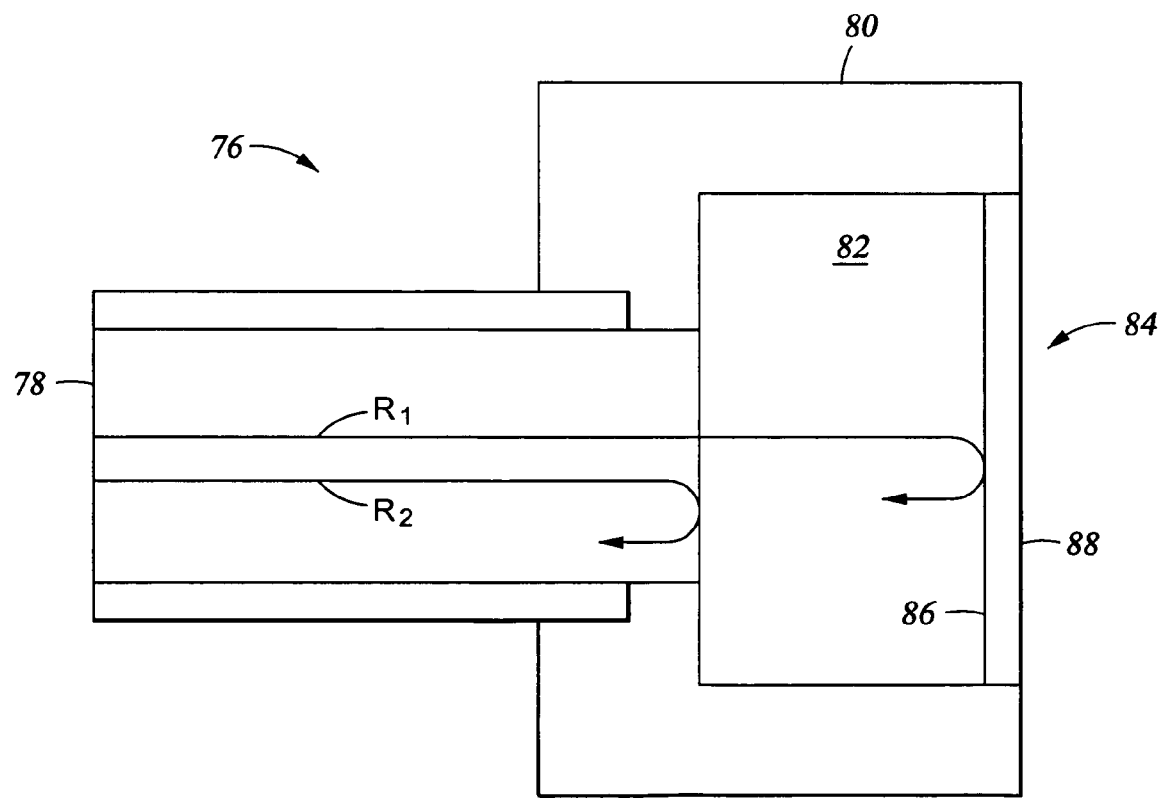
FIG. 4 is a cutaway view of an embodiment of a pressure sensor.
Figure 5:
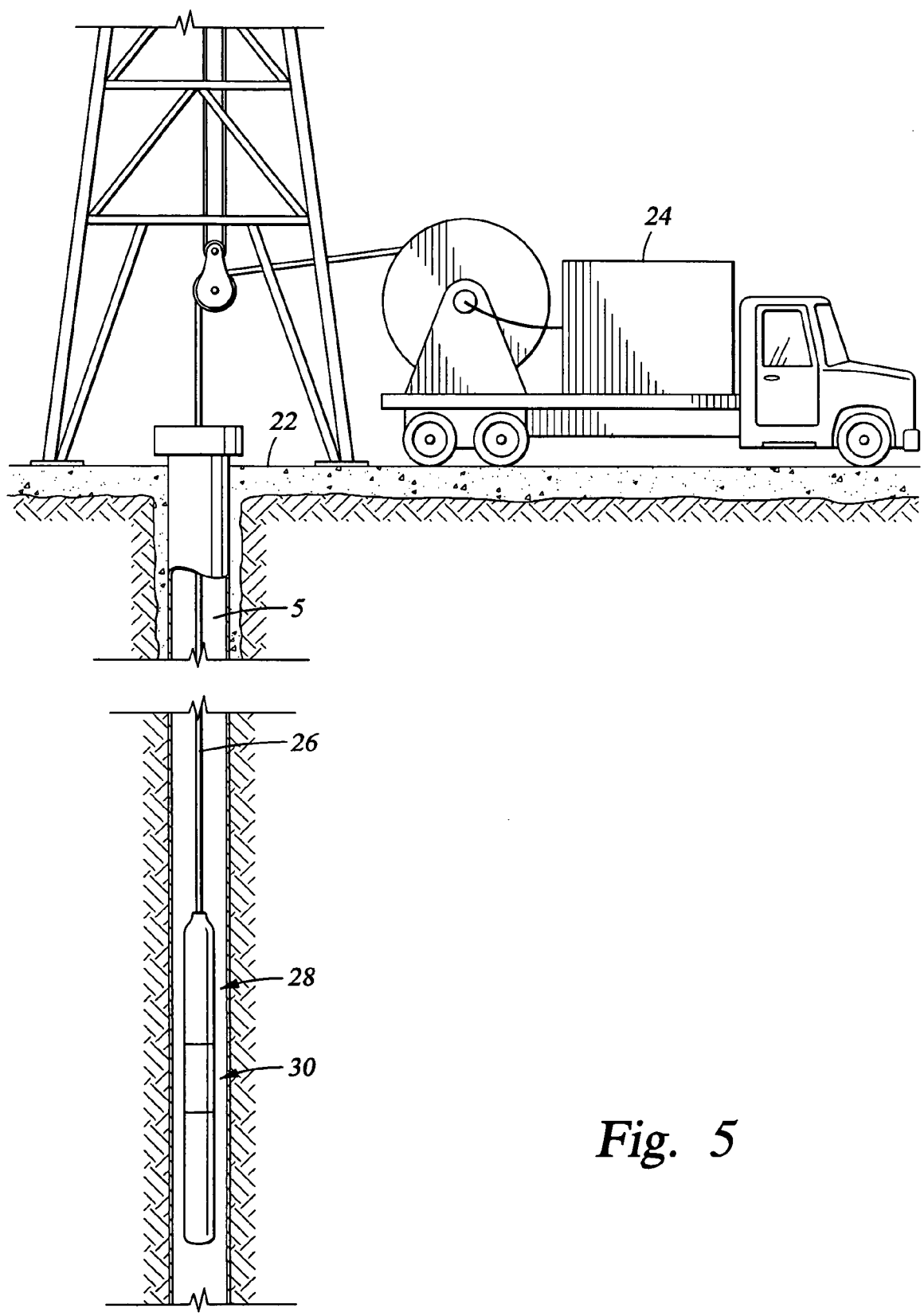
FIG. 5 is a partial cut-away view of a logging tool disposed in a wellbore having a pressure sensor therein.

In the embodiment of FIG. 4, a fiber optic member 78 is coupled to one end of a housing 80, where a reflective member 84 is positioned in the housing 80 opposite to the fiber optic member 78. Also within the housing 80 is a gap 82 that separates the terminal end of the fiber optic member 78 from the reflective member 84. As shown, the reflective member 84 is substantially planar having a reflective surface 86 facing the cavity 86 and a pressure surface 88 formed for exposure to ambient conditions. As with the embodiment of FIG. 3, a portion of a light wave passing through the optic member 78 reflects from the terminal end of the member 78 back into the fiber optic member 78. Also, a portion of that light wave exits the fiber optic member 78, passes through the cavity 82 to the reflective member 84 where it can be reflected from the reflective member 84 back into the fiber optic member 78. In this embodiment, the housing 80 as well as the reflective member 84 can be comprised of a material having a low coefficient of thermal expansion or an ultralow coefficient of thermal expansion.

A yet alternative optical method would make use of a Fiber Bragg Grating (FBG). When the FBG is made out of a material having a low or ultralow coefficient of thermal expansion, the corresponding sensor will have negligible sensitivity to temperature so it will respond almost exclusively to pressure. In the optical mode, the light signal can be received and detected by signal detection devices known in the art, this includes the fiber optic member and associated components associated with the fiber optic member used in registering the light signals received by the fiber optic member.

With reference now to FIG. 2, a logging device 28 is shown disposed within a wellbore 5. The logging device 28 is suspended within the wellbore 5 via a wireline on one end and attached to a surface truck 24 on the other end. As is known, surface trucks 24 are typically kept at surface 22 for servicing and controlling such logging devices 28. Integral with the logging device 28 is shown a pressure monitoring system 30. The pressure monitoring system 30 can comprise any of the embodiments of the pressure sensors discussed herein. One of the many advantages of the device of the present disclosure is that when the pressure sensor is disclosed within such a wellbore 5, often the temperature within the wellbore 5 can exceed 300° F.-400° F. However due to the low coefficient of expansion of the material comprising the medium, even increases in fluid temperature experienced by the sensor will have a negligible to no effect on the corresponding ability to accurately measure such ambient pressures. Apertures (not shown) may be included on the outer surface of the pressure monitoring system to allow communication between the wellbore fluid onto the sensor such that it is able to fully sense the pressure within the wellbore 5.

This improved result of the device and method of the present disclosure is not limited to measuring high temperature wellbore fluids, but extends to any fluid pressure measurement where high or low temperatures are encountered. Thus not only can high temperature fluids be accurately measured over a large temperature gradient, similarly the pressure of cryogenic or other very low temperature fluids can also be measured as well.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of measuring the pressure of a fluid comprising:
   exposing a sensor to the pressure of the fluid, wherein the sensor comprises a medium having a low thermal expansion coefficient;
   emitting an acoustic signal through the medium;
   observing the sound speed of the acoustic signal propagating through the medium; and
   estimating the pressure of the fluid based on the observed sound speed of the medium within the sensor.

2. The method of claim 1 further comprising calibrating the sensor at a known pressure thereby obtaining a sound speed of the medium at the known pressure.

3. The method of claim 2 further comprising, conducting at least one additional calibrating step, comparing the observed sound speed with the calibrated sound speeds, and choosing a calibrated sound speed that correlates to the measured sound speed.

4. The method of claim 3 further comprising obtaining the calibrated pressure that correlates to the calibrated sound speed, wherein the pressure of the fluid is substantially equal to the calibrated pressure.

5. The method of claim 1 wherein the sensor is disposed within a wellbore.

6. The method of claim 1 wherein the medium has a coefficient of expansion of less than or equal to 500 ppb/° C.

7. The method of claim 1 wherein the medium has a coefficient of expansion of less than or equal to 100 ppb/° C.

8. The method of claim 1 wherein the medium has a coefficient of expansion of less than or equal to 20 ppb/° C.

9. The method of claim 1 wherein the medium has a coefficient of expansion of less than or equal to 10 ppb/° C.

10. The method of claim 1 wherein the medium has a coefficient of expansion of less than or equal to 5 ppb/° C.

11. The method of claim 1 wherein the medium is comprised of fused silica.

12. The method of claim 1 wherein the medium comprises two opposing outer surfaces.

13. The method of claim 12 further comprising coupling an acoustic transducer with one of said surfaces.

14. The method of claim 13 further comprising coupling a second transducer on the other surface, wherein the acoustic transducer emits an acoustic signal and the second transducer is capable of receiving the acoustic signal.

15. The method of claim 1 wherein the step of observing travel time through the medium comprises measuring the signal travel time from a first end to a second end.

16. The method of claim 15 further comprising obtaining the sound speed through the medium by dividing the distance from the first to the second end by the observed travel time.

17. The method of claim 1 wherein the signal travels from a first end of the medium to a second end and a portion of the signal reflects from the second end to the first end and wherein the step of observing travel time through the medium comprises measuring the signal travel time from the first to the second end, measuring the reflected signal travel time from the second end to the first end, and summing these respective signal travel times to obtain a total travel time.

18. The method of claim 17 further comprising dividing twice the value of the distance between the first and second surface by the total travel time.

19. The method of claim 1 further comprising coupling the sensor with a well logging device.

20. A method of determining fluid pressure comprising:
   exposing a medium to the pressure of a fluid, wherein the medium has a low coefficient of expansion;
   passing a signal through the medium;
   measuring the behavior of the signal passing through the medium to obtain an ambient behavior;
   comparing the measured signal behavior with a calibrated signal behavior within the medium at a known pressure; and
   calculating the fluid pressure based on the comparison of the signal behavior between the ambient and the calibrated behaviors.

21. The method of claim 20 wherein the signal is an acoustic signal.

22. The method of claim 21 wherein the acoustic signal is produced by a transducer coupled to the medium.

23. The method of claim 20 wherein the signal behavior comprises the sound speed through the medium.

24. The method of claim 20 wherein the signal behavior comprises the optical interference of the medium.

25. A fluid pressure measuring device comprising:
   a medium having a low thermal expansion coefficient in pressure communication with a fluid to be measured;
   a signal source in communication with the medium; and
   a signal detection device in communication with the medium, so that when the signal source generates a signal that propagates through the medium, the signal detection device can observe the signal and the signal travel time so that the sound speed of the medium at a fluid pressure can be determined.

26. The fluid pressure device of claim 25, wherein the medium has a coefficient of expansion of less than or equal to about 50 ppb/° C.

27. The fluid pressure device of claim 25 wherein the signal source comprises a transducer configured for generating and receiving an acoustic signal.

28. The fluid pressure device of claim 25 further comprising a second transducer coupled with the medium.

29. The fluid pressure device of claim 28 wherein the second transducer is configured to receive an acoustic signal.

30. The fluid pressure device of claim 25, wherein the signal source produces a light signal.

31. The fluid pressure device of claim 25, wherein the signal detection device detects the optical interference of the medium.

32. The fluid pressure device of claim 25, disposed in a wellbore tool.

33. The fluid pressure device of claim 25 wherein the medium comprises a Fiber Bragg Grating.

34. The fluid pressure device of claim 25 wherein the sensor further comprises a fiber optic member in communication with the medium.

35. The fluid pressure device of claim 25 further comprising a fiber optic member, a housing, and a cavity formed within the housing, wherein the housing is configured to receive the fiber optic member and the medium, and wherein a gap is disposed between the fiber optic member and the medium.

36. The fluid pressure device of claim 35, wherein the medium has a coefficient of expansion of less than or equal to about 50 ppb/° C.

37. The fluid pressure device of claim 35, wherein the axis of the fiber optic member is substantially perpendicular to the medium.

38. The fluid pressure device of claim 25 wherein the medium comprises a housing with a reflective plate and the signal source comprises a fiber optic member that is disposed in the housing and directed at the plate.

* * * * *